US012733727B2

(12) United States Patent
Fogueteiro et al.

(10) Patent No.: US 12,733,727 B2
(45) Date of Patent: Sep. 15, 2026

(54) ASSEMBLY COMPRISING A BOTTLE, AN AESTHETIC BAND AND A SYSTEM FOR ATTACHING THE AESTHETIC BAND TO THE BOTTLE

(71) Applicant: CHANEL PARFUMS BEAUTE, Neuilly sur Seine (FR)

(72) Inventors: Paulo Fogueteiro, Neuilly sur Seine (FR); Floriane Peronne, Neuilly sur Seine (FR)

(73) Assignee: CHANEL PARFUMS BEAUTE, Neuilly sur Seine (FR)

( * ) Notice: Subject to any disclaimer, the term of this patent is extended or adjusted under 35 U.S.C. 154(b) by 184 days.

(21) Appl. No.: 18/710,474

(22) PCT Filed: Nov. 22, 2021

(86) PCT No.: PCT/FR2021/052063
§ 371 (c)(1),
(2) Date: May 15, 2024

(87) PCT Pub. No.: WO2023/089246
PCT Pub. Date: May 25, 2023

(65) Prior Publication Data
US 2025/0009109 A1 Jan. 9, 2025

(51) Int. Cl.
*A45D 40/26* (2006.01)
*A45D 40/00* (2006.01)
*B05C 17/005* (2006.01)

(52) U.S. Cl.
CPC ...... *A45D 40/26* (2013.01); *A45D 2040/0012* (2013.01); *A45D 2200/05* (2013.01);
(Continued)

(58) Field of Classification Search
CPC ............ A45D 40/26; A45D 2040/0012; A45D 2200/056; A45D 2200/05;
(Continued)

(56) References Cited

U.S. PATENT DOCUMENTS 6,053,363 A * 4/2000 Revenu ............... B05B 11/0038 222/88
9,861,177 B2 * 1/2018 Lefevre ............... B05B 11/0054
10,717,098 B2 * 7/2020 Delmon ................ B05B 11/026

FOREIGN PATENT DOCUMENTS

FR 2565799 A1 12/1985
FR 2790743 A1 9/2000
(Continued)

OTHER PUBLICATIONS

Sep. 12, 2022 International Search Report issued in International Patent Application No. PCT/FR2021/052063.
(Continued)

*Primary Examiner* — David J Walczak
(74) *Attorney, Agent, or Firm* — Williams Mullen; R. Brian Drozd

(57) ABSTRACT

An assembly that includes a bottle with a rectangular neck, where each corner has a recess, an aesthetic band positioned on the neck and has a first plate through which a first window passes and a first external skirt, an attachment system includes a second plate through which a second window passes and positioned between the neck and the first plate, four lugs secured to the second plate, where each lug is positioned under one of the shoulders of the neck, and attachment means that secure the aesthetic band to said attachment system. With such an arrangement, the attachment system has a particular form affording a reduction in thicknesses around the neck.

15 Claims, 7 Drawing Sheets

(52) U.S. Cl.
CPC .. *A45D 2200/054* (2013.01); *A45D 2200/056* (2013.01); *B05C 17/00569* (2013.01)

(58) Field of Classification Search
CPC ........ A45D 2200/051; A45D 2200/054; A45D 2200/055; B08B 11/1047; B08B 11/0038; B08B 11/0054; B05C 17/005; B05C 17/00569; B05C 17/00573
USPC .......................... 222/183; 215/227, 272–275
See application file for complete search history.

(56) References Cited

FOREIGN PATENT DOCUMENTS

| | | | |
|---|---|---|---|
| FR | 2823081 | A1 | 10/2002 |
| FR | 3019528 | A1 | 10/2015 |
| FR | 3071388 | A1 | 3/2019 |

OTHER PUBLICATIONS

Sep. 12, 2022 Written Opinion issued in International Patent Application No. PCT/FR2021/052063.

* cited by examiner

ASSEMBLY COMPRISING A BOTTLE, AN AESTHETIC BAND AND A SYSTEM FOR ATTACHING THE AESTHETIC BAND TO THE BOTTLE

TECHNICAL FIELD

The present invention relates to the general field of bottles for dispensing fluid products, such as creams. The invention relates to an assembly comprising a bottle with a neck, an aesthetic band that is positioned around the neck and an attachment system that secures the aesthetic band to the neck.

PRIOR ART

Currently there are assemblies that comprise a bottle with a dispensing mechanism, such as for example a pump actuated by a hand of a user.

To conceal the neck of the bottle and part of the dispensing mechanism, placing an aesthetic band around the neck is known.

For aesthetic reasons, in particular, in the context of dispensing a cosmetic product of the beauty product type, using bottles the neck of which has a rectangular cross-section is known.

In order to secure the aesthetic band to the neck, the latter is surmounted by a rim that provides the securing of the aesthetic band to the neck.

Although such an arrangement gives good results, the external dimensions of the aesthetic band are relatively great to encompass the rim and the means for attaching the aesthetic band to the rim.

DISCLOSURE OF THE INVENTION

One object of the present invention is to propose an assembly comprising a bottle with a neck, an aesthetic band that is positioned around the neck and an attachment system that secures the aesthetic band to the neck, where the attachment system has a particular form allowing a reduction in the thicknesses around the neck.

For this purpose, an assembly having a vertical direction is proposed, comprising:

- a bottle comprising a hollow body and a neck at the top of the hollow body, where the external perimeter of the neck takes the form of a rectangle with four rounded corners, where, at each corner and over the height of the neck, said neck divides into a bottom part extending upwards from the hollow body and a top part extending upwards from the bottom part, where, at each corner, the bottom part has an inward recess to form a shoulder under the top part,
- an aesthetic band comprising a first plate through which a first window passes and a first external skirt extending downwards from the external periphery of the first plate, where the aesthetic band is positioned on the neck, and
- an attachment system comprising:
- a second plate through which a second window passes and positioned between the top part of the neck and the first plate of the aesthetic band,
- four lugs secured to the second plate, where each lug is positioned under one of the shoulders of the neck, and
- attachment means that secure the aesthetic band to said attachment system.

With such an arrangement, the attachment system has a particular form affording a reduction in thicknesses around the neck.

Advantageously, the aesthetic band comprises a cover that comprises a third plate through which a third window passes and positioned between the first plate and the second plate and a first internal skirt that extends downwards from the edge of the third window through the second window.

According to a particular embodiment, the attachment means take the form of an internal gripping means that is disposed along the edge of the second window and grips the first interior skirt.

Advantageously, the cover comprises a second external skirt secured to the third plate and extending downwards from the external periphery of the third plate, and the attachment means also consist of a tight fit between the first external skirt and the second external skirt.

Advantageously, the attachment means comprise an external clamping means disposed around the second plate and which rubs against the internal face of the first external skirt.

Advantageously, the internal clamping means takes the form of a hollow truncated cone a large base of which is secured to the second plate and a small base of which extends downwards from the large base and delimits a circle where the first internal skirt is inserted, where the internal clamping means takes the form of internal teeth issuing from the second plate and distributed around the second window while extending inwards so that the end of each internal tooth rubs against the internal face of the first internal skirt and grips in the first internal skirt.

According to a particular embodiment, the cover comprises a second external skirt secured to the third plate and extending downwards from the external periphery of the third plate and the attachment means consist of a tight fit between the first external skirt and the second external skirt.

Advantageously, the assembly comprises anti-floating means that provide pressure of the attachment system against the aesthetic band and against the outside of the neck.

According to a particular embodiment, the anti-floating means take the form of anti-floating tongues, where each is secured to the second plate and projects downwards and outwards to be in abutment through one of its faces against the internal face of the first external skirt and through the other one of its faces against the outside of the neck.

According to a particular embodiment, the cover comprises a second external skirt secured to the third plate and extending downwards from the external periphery of the third plate and the anti-floating means take the form of cambered walls, each cambered wall has, on an external face, a groove that extends parallel to the vertical direction along the second external skirt and on an internal face a camber that extends parallel to the vertical direction along the second external skirt, in each groove a rib on the first external skirt provided for this purpose is inserted, and where each groove exerts a pressure on the rib and each camber exerts a pressure against the outside of the neck.

Advantageously, the assembly comprises holding means intended to grip at least one out of a reservoir or a dispensing mechanism secured to said reservoir when they are disposed in the bottle.

Advantageously, the holding means take the form of a plurality of reliefs produced at the first internal skirt of the cover and distributed around the third window, where each relief extends inside said third window and comes into abutment against the dispensing mechanism.

Advantageously, the holding means take the form of a plurality of holding tongues secured to the second plate and distributed inside the second window, where each holding tongue extends inside the third window and comes into abutment against the reservoir.

Advantageously, the assembly comprises centring means that provide the centring of the attachment system with respect to the orifice.

Advantageously, the centring means comprise at least three centring tongues distributed around the vertical direction, secured to the second plate, where each centring tongue is arranged so that, in the assembled position, it is positioned aslant against the edge of the orifice.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
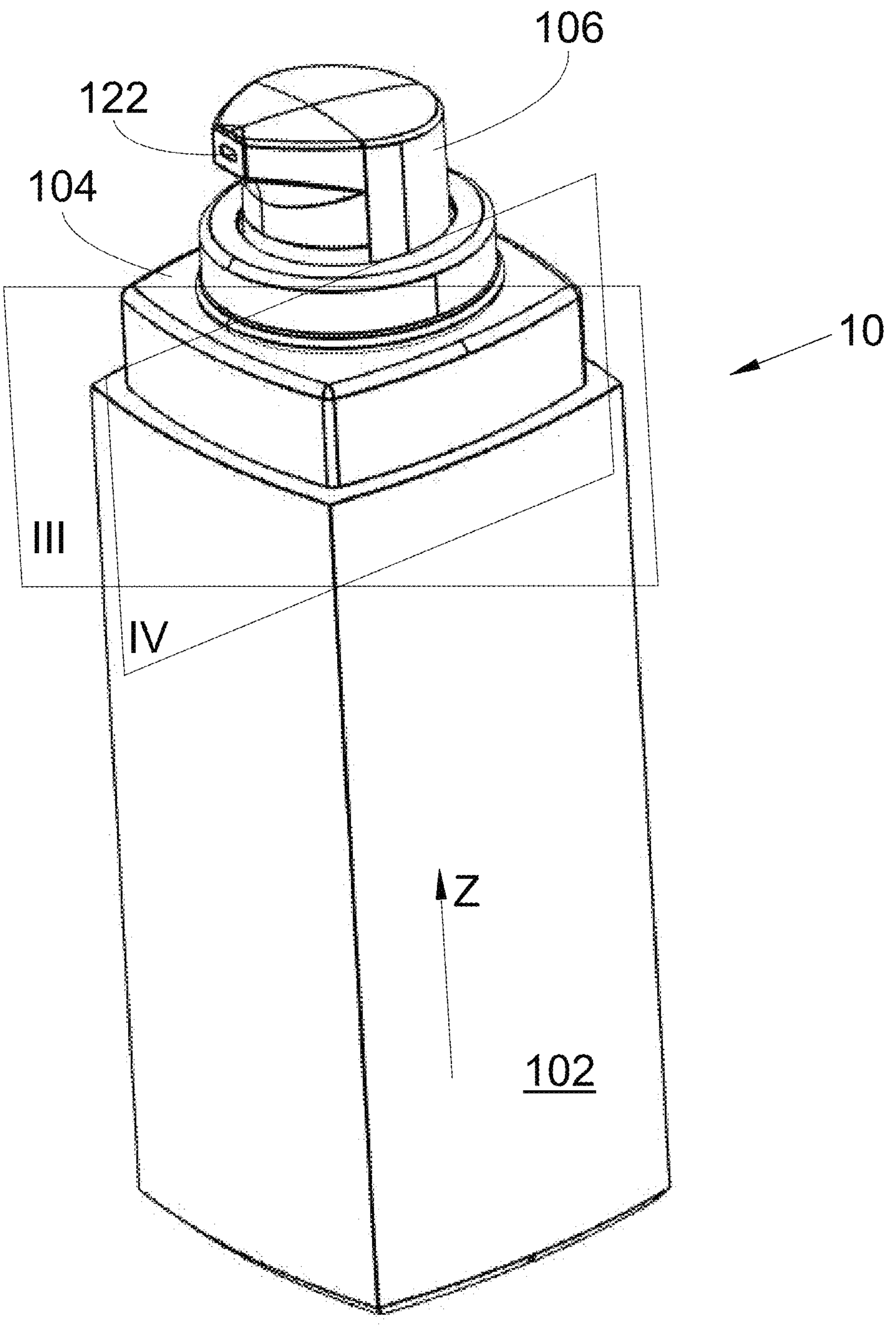
FIG. 1 is a perspective view of an assembly according to the invention.

FIG. 1 shows an assembly 10 according to the invention. This assembly 10 comprises a bottle 102, an aesthetic band 104 and a dispensing mechanism 106 that here takes the form of a manual pump activated by a hand of a user and which is immersed in a reservoir (120, FIG. 3).

In the following description, the terms relating to a position are taken with reference to an assembly 10 in the normal position of use, i.e. as shown on FIG. 1. In the following description, and by convention, the vertical direction is called Z.

Figure 2:
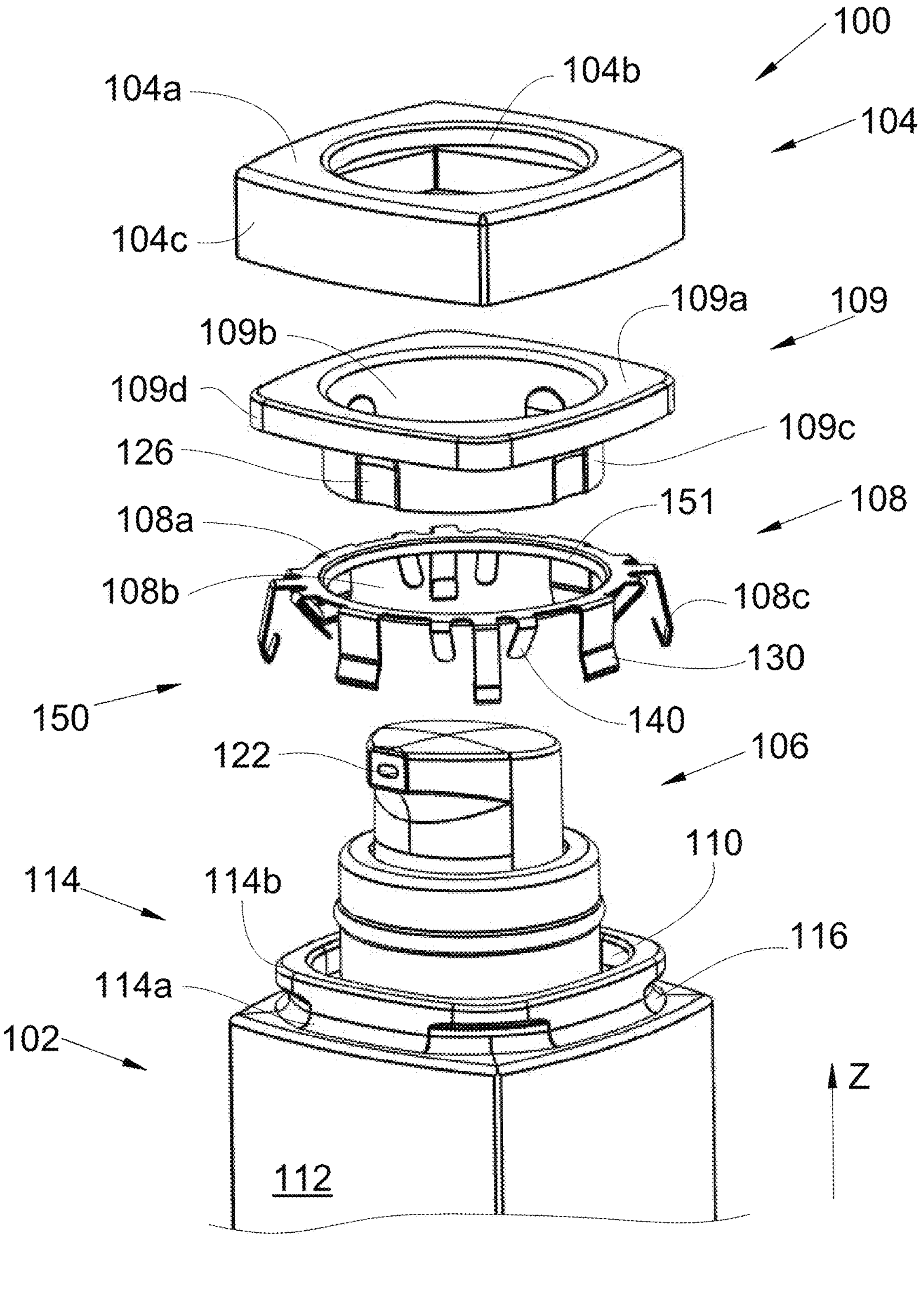
FIG. 2 is an exploded view of the bottle of FIG. 1 according to a first embodiment of the invention.
Figure 5:
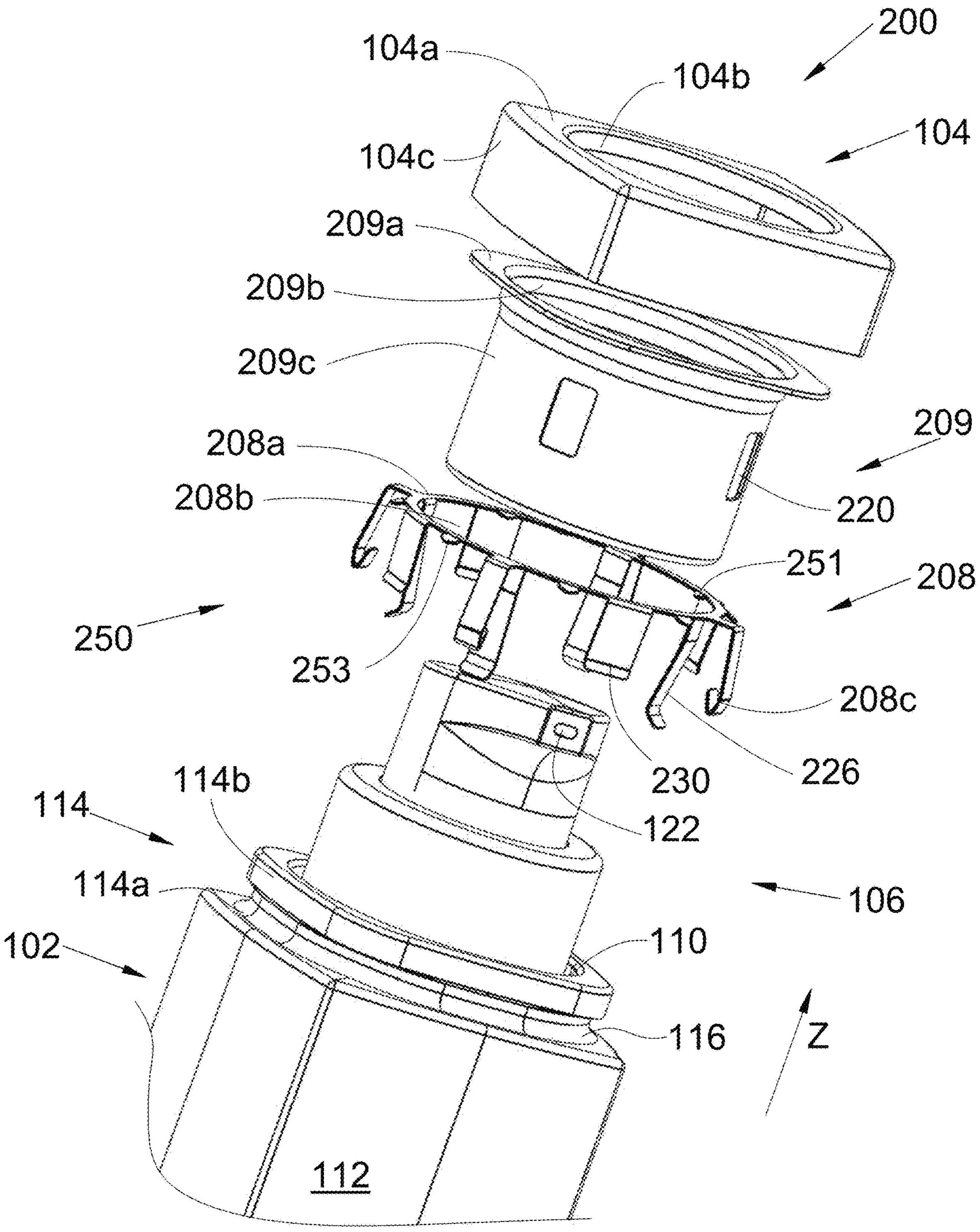
FIG. 5 is an exploded view in perspective of the bottle of FIG. 1 according to a second embodiment of the invention.
Figure 8:
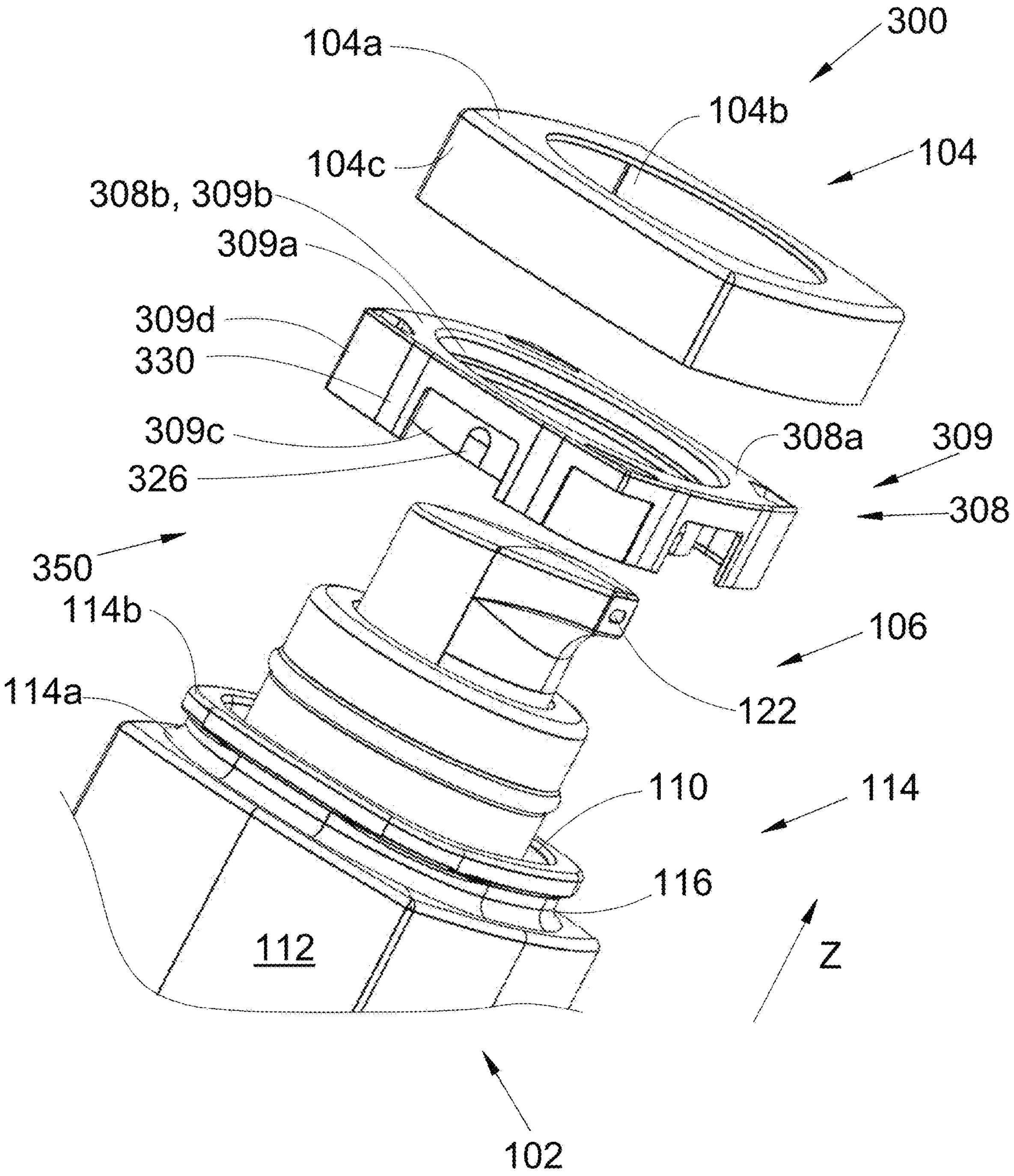
FIG. 8 is an exploded view in perspective of the bottle of FIG. 1 according to a third embodiment of the invention.

FIG. 2 shows the assembly 100 according to a first embodiment of the invention, in which the aesthetic band 104 has been lifted. FIG. 5 shows the assembly 200 according to a second embodiment of the invention, in which the aesthetic band 104 has been lifted. FIG. 8 shows the assembly 300 according to a third embodiment of the invention, in which the aesthetic band 104 has been lifted.

Figure 4:
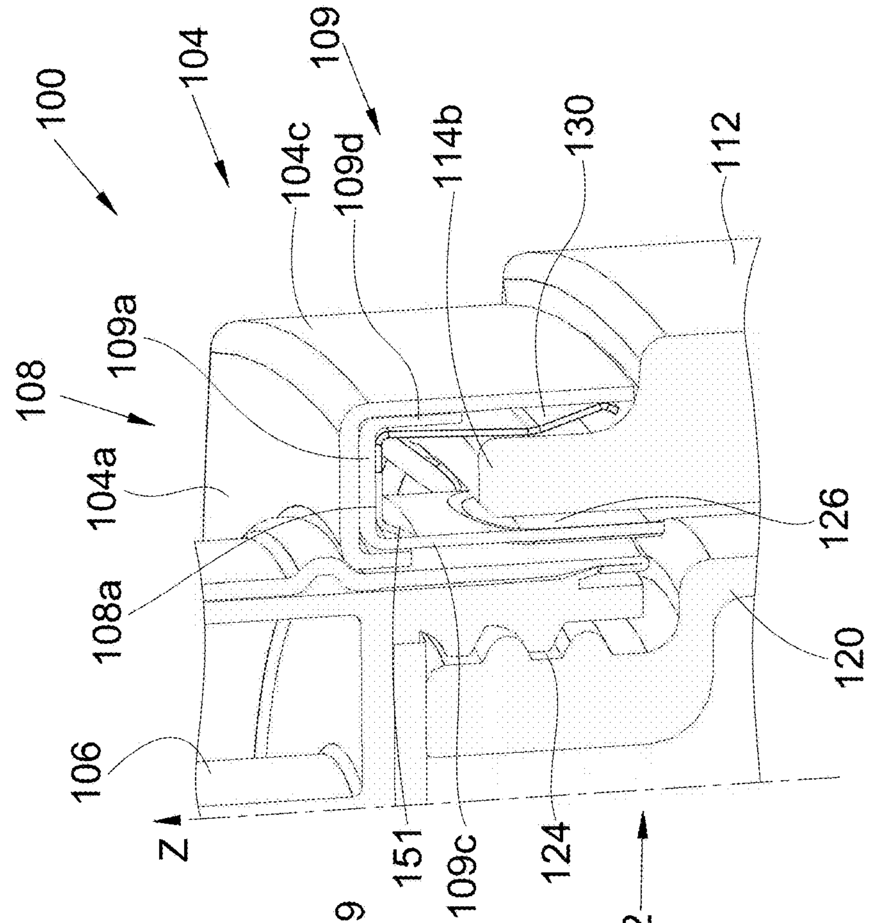
FIG. 4 is a view in cross section along the plane IV of FIG. 1 for the first embodiment of the invention.
Figure 3:
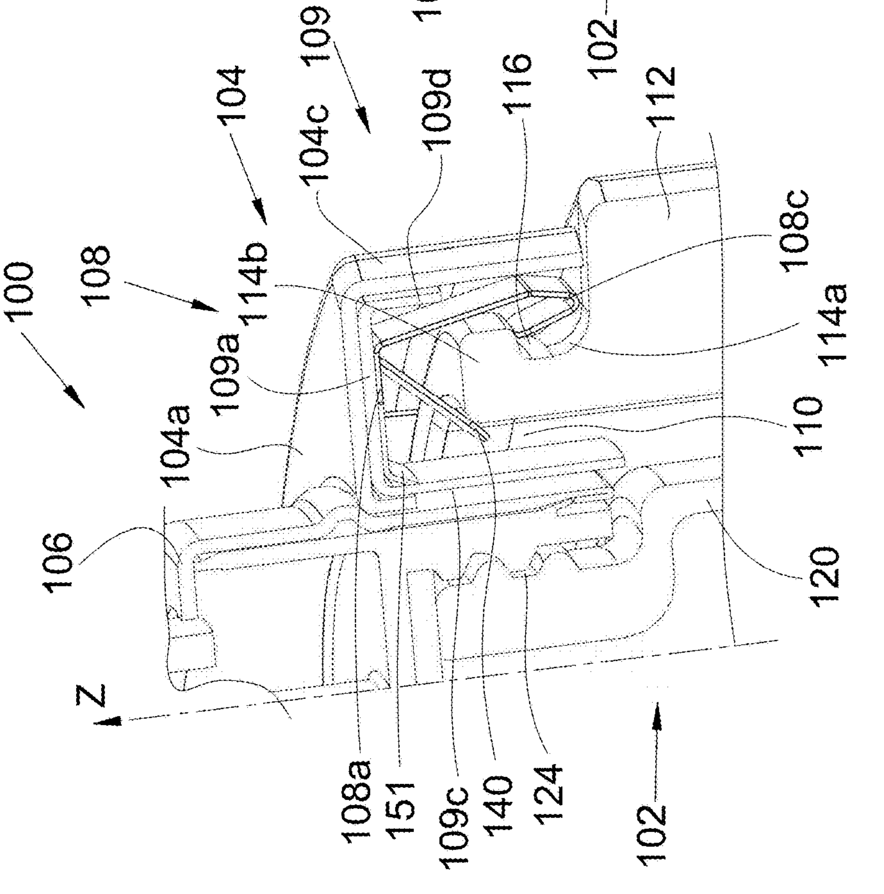
FIG. 3 is a view in cross section along the plane III of FIG. 1 for the first embodiment of the invention.
Figure 7:
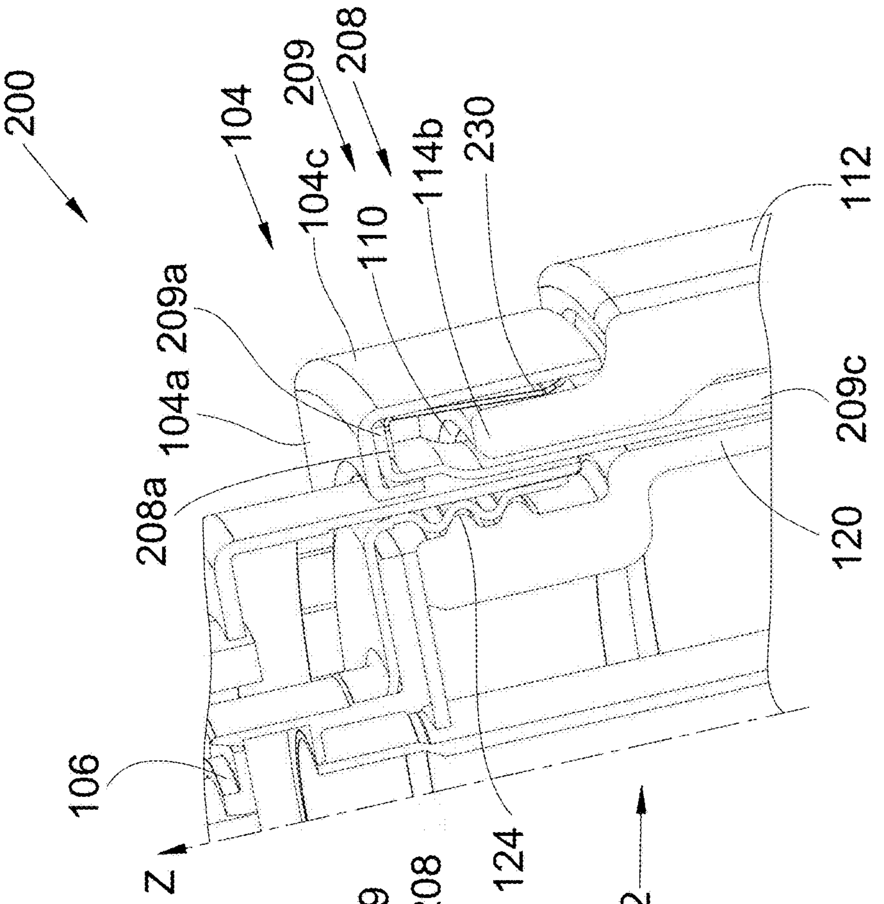
FIG. 7 is a view in cross section along the plane IV of FIG. 1 for the second embodiment of the invention.
Figure 6:
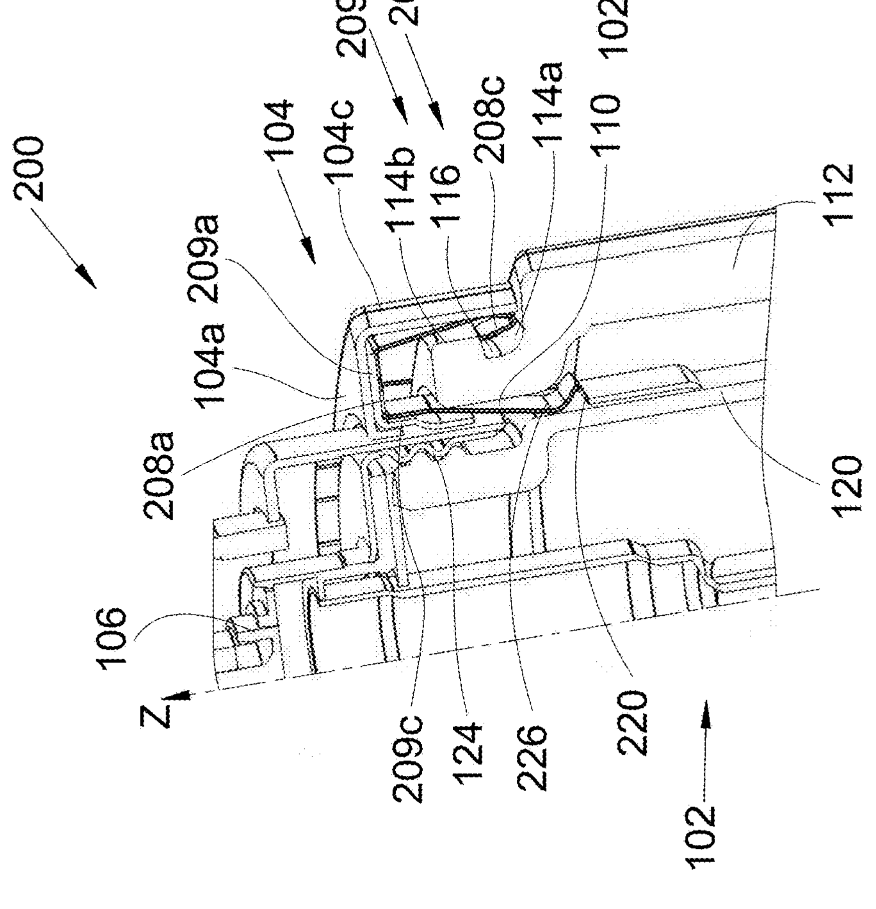
FIG. 6 is a view in cross section along the plane III of FIG. 1 for the second embodiment of the invention.
Figure 10:
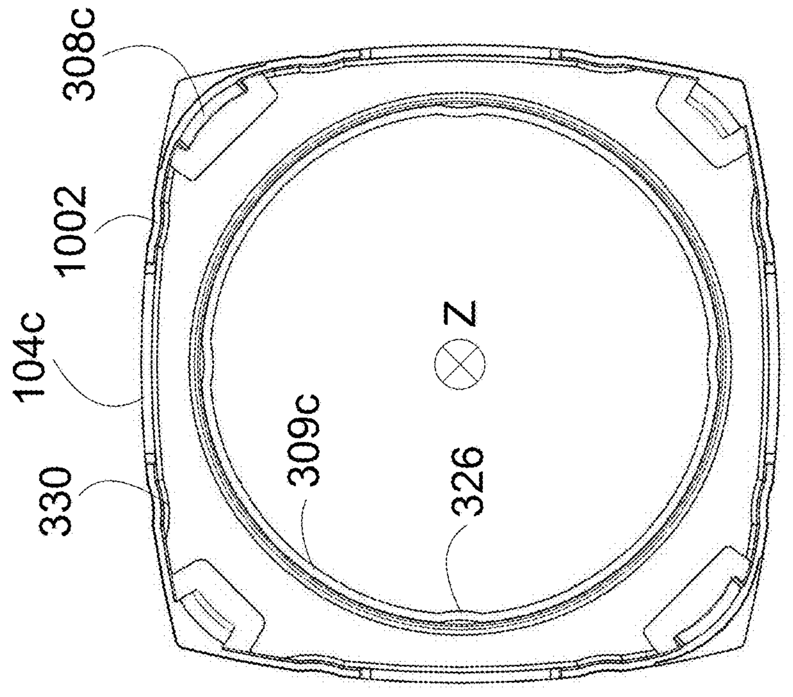
FIG. 10 is a view from below of the aesthetic band of the third embodiment of the invention.
Figure 9:
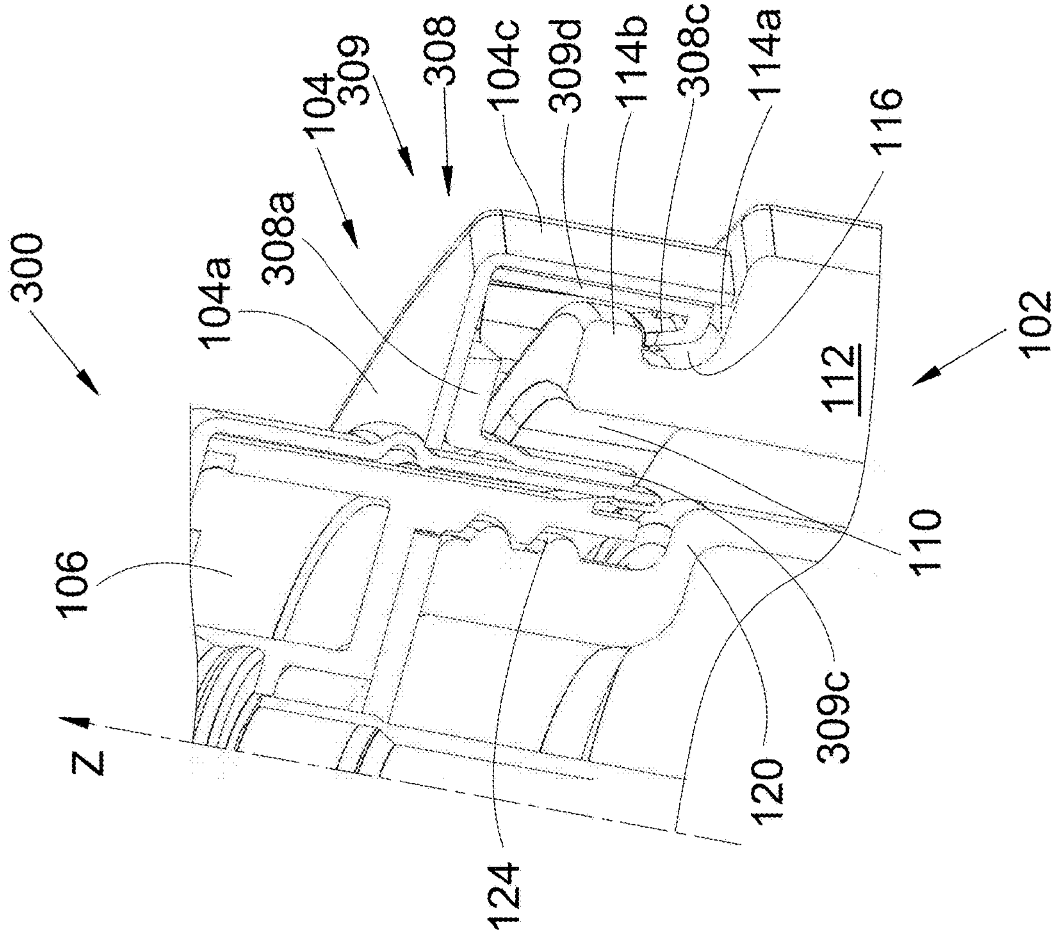
FIG. 9 is a view in cross section along the plane III of FIG. 1 for the third embodiment of the invention.

FIGS. 3 and 4 show cross sections of the assembly 100 according to the first embodiment. FIGS. 6 and 7 show cross sections of the assembly 200 according to the second embodiment. FIGS. 9 and 10 show details of implementation of the assembly 300 according to the third embodiment.

In the three embodiments of the invention, the aesthetic band 104 comprises a first plate 104*a* that extends horizontally and is passed through by a first window 104*b* through which the dispensing mechanism 106 passes and a first external skirt 104*c* extending downwards from the external periphery of the first plate 104*a*, i.e. the external edge of the first plate 104*a*.

The bottle 102 comprises a hollow body 112 and a neck 114 that is secured to the hollow body 112 and at the top of the latter. The neck 114 delimits an orifice 110 for access to the interior of the hollow body 112 through which the dispensing mechanism 106 passes which is connected to the reservoir 120 housed in the hollow body 112. The reservoir 120 can contain any type of fluid product such as for example a cream, and the dispensing mechanism 106 is provided for capturing the fluid product contained in the reservoir 120 and for discharging it towards the outside through a hole 122 provided for this purpose. The dispensing mechanism 106 is not described any further, since it does not directly form part of the scope of the invention and can take various forms known to a person skilled in the art.

In the plane of the orifice 110 which is here perpendicular to the vertical direction Z, the external perimeter of the neck 114 takes the form of a rectangle with four rounded corners, and more particularly here a square with four rounded corners. In the description, the orifice 110 and the various windows that are described above and below are coaxial in the vertical direction Z.

At each corner and over the height of the neck 114, said neck 114 is divided into a bottom part 114*a* and a top part 114*b*. The bottom part 114*a* extends upwards from the hollow body 112 and the top part 114*b* extends upwards from the bottom part 114*a*.

At each corner, the bottom part 114*a* has an inward recess 116, i.e. the top part 114*b* overhangs the recess 116 while thus defining a shoulder under the top part 114*b*. The recess 116 is present only at the corners, which makes it possible to reduce the thickness of the neck 114 between two corners. The angular extent around the vertical direction Z of the recess 116 is for example 20° on either side of the corner.

In the assembled position, the aesthetic band 104 is positioned on the neck 114 and the first external skirt 104*c* descends as far as the hollow body 112.

The assembly 100, 200, 300 also comprises an attachment system 108, 208, 308 that provides the securing of the aesthetic band 104 to the neck 114 of the bottle 102 and takes different forms according to the embodiment. In the assembled position, the attachment system 108, 208, 308 is housed inside the aesthetic band 104.

The attachment system 108, 208, 308 comprises a second plate 108*a*, 208*a*, 308*a* that extends horizontally and has passing through it a second window 108*b*, 208*b*, 308*b* through which the dispensing mechanism 106 passes and four lugs 108*c*, 208*c*, 308*c* (FIG. 9) secured to the second plate 108*a*, 208*a*, 308*a*. The second window 108*b*, 208*b*, 308*b* and the first window 104*b* are aligned with the orifice 110.

In the assembled position, the attachment system 108, 208, 308 is placed between the neck 114 and the aesthetic band 104 so that the second plate 108*a*, 208*a* 308*a* is located between the top part 114*b* of the neck 114 and the first plate 104*a* of the aesthetic band 104.

Each lug 108*c*, 208*c*, 308*c* is arranged so that, in the assembled position, it is positioned under one of the shoulders of the neck 114, i.e. in one of the recesses 116, to provide the securing of the attachment system 108, 208, 308 to the neck 114. Each lug 108*c*, 208*c*, 308*c* is oriented perpendicularly to the vertical direction Z and inwards.

The attachment system 108, 208, 308 also comprises attachment means 150, 250, 350 that provide the securing of the aesthetic band 104 to the attachment system 108, 208, 308.

Thus, by providing the securing of the attachment system 108, 208, 308 to the neck 114 solely in the corners of the neck 114, it is possible to produce protrusions on the neck 114 solely in the corners, thus making it possible to reduce the thickness of the neck 114 between the corners for better integration in particular in the case of a hollow body 112 with a rectangular or even square cross section.

In the first and second embodiments of the invention, the attachment system 108, 208 is preferably implemented by a spring plate made from folded metal.

In the third embodiment, the attachment system 308 consists of a piece made from moulded plastics material.

To conceal, among other things, the attachment system 108, 208, 308, each aesthetic band 104 comprises a cover 109, 209, 309 that is positioned under the first plate 104*a* and inside the lugs 108*c*, 208*c*, 308*c*.

The cover 109, 209, 309 comprises a third plate 109*a*, 209*a*, 309*a* that is positioned between the first plate 104*a* and the second plate 108*a*, 208*a* 308*a* and which has passing through it a third window 109*b*, 209*b*, 309*b* through which the dispensing mechanism 106 passes and a first internal skirt 109*c*, 209*c*, 309*c* that extends downwards from the internal periphery of the third plate 109*a*, 209*a*, 309*a*, i.e. from the edge of the third window 109*b*, 209*b*, 309*b*, thus delimiting a well from the third window 109*b*, 209*b*, 309*b*. The third window 109*b*, 209*b*, 309*b* and the first window 104*b* are aligned with the orifice 110.

In the first and second embodiments of the invention, the cover 109, 209 is a piece additional to the aesthetic band 104 and, in the third embodiment of the invention, the cover 309 is in a single piece with the attachment system 308.

In this last embodiment, the third plate 309*a* corresponds to the second plate 308*a* and the third window 309*b* corresponds to the second window 308*b*.

The first internal skirt 109*c*, 209*c*, 309*c* is positioned through the second window 108*b*, 208*b* 308*b* and inside with respect to the lugs 108*c*, 208*c* 308*c* so that the attachment system 108, 208, 308 and the lugs 108*c*, 208*c* 308*c* cannot be seen, in particular when the reservoir 120 and the dispensing mechanism 106 are removable and withdrawn by withdrawing through the windows.

In the first and third embodiments of the invention, the cover 109, 309 also comprises a second external skirt 109*d*, 309*d* secured to the third plate 109*a*, 309*a* and extends downwards from the external periphery of the third plate 109*a*, 309*a*, i.e. the external edge of the third plate 109*a*, 309*a*. The second external skirt 109*d*, 309*d* is applied against the internal face of the first external skirt 104*c* to reinforce the attachment between them.

In the first embodiment of the invention, the attachment means 150 here take the form of an internal clamping means 151 that is disposed along the edge of the second window 108*b* and grips the first internal skirt 109*c*, and the attachment means 150 are supplemented by a tight fit between the first external skirt 104*c* and the second external skirt 109*d*. The dimensions of the internal clamping means 151 and of the first internal skirt 109*c* are such that the first internal skirt 109*c* is forcibly inserted in the internal clamping means 151. If required, it is also possible to supplement the securing by gluing the aesthetic band 104 and the cover 109.

The internal clamping means 151 here takes the form of a truncated cone 151 which is hollow and forms the edge of the second window 108*b*. The truncated cone 151 comprises a large base secured to the second plate 108*a* and a small base that extends downwards from the large base and delimits a circle where the first internal skirt 109*c* is inserted. The dimensions of the circle and of the first internal skirt 109*c* are such that the first internal skirt 109*c* is forcibly inserted in the circle. According to another embodiment, the internal clamping means 151 can take the form of internal teeth issuing from the second plate 108*a* and extending inwards so that the end of each internal tooth rubs against the external face of the first internal skirt 109*c*. Because of the rubbing of the internal teeth against the external face of the first internal skirt 109*c*, each internal tooth curves and exerts a force and each internal tooth is thus gripped in the first internal skirt 109*c*.

In the second embodiment of the invention, the attachment means 250 comprise an external clamping means 253 disposed around the second plate 208*a* and which rubs against the internal face of the first external skirt 104*c*.

In the second embodiment, the external clamping means 253 takes the form of external teeth 253 issuing from the second plate 208*a* and distributed around it. Each external tooth 253 extends outwards so that the end of each external tooth 253 rubs against the internal face of the first external skirt 104*c*, and as before is gripped in the first external skirt 104*c*.

Although the use of the external clamping means 253 is described in the context of the second embodiment, it can be used for the first embodiment for interacting with the internal face of the second external skirt 109*d* and/or the internal face of the first external skirt 104*c*.

In the third embodiment of the invention, the attachment means 350 are formed by a tight fit between the first external skirt 104*c* and the second external skirt 309*d*. If required, it is also possible to supplement the securing by gluing the aesthetic band 104 and the cover 309.

As with the first embodiment, the attachment means 250 of the second embodiment of the invention here comprise an internal clamping means 251 that is disposed along the edge of the second window 208*b* and clamps the first internal skirt 209*c*. In the embodiment presented in FIG. 5, the internal clamping means 251 takes the form of internal teeth 251 issuing from the second plate 208*a* and distributed around the second window 208*b*. Each internal tooth 251 extends inwards so that the end of each internal tooth 251 rubs against the internal face of the first internal skirt 209*c*, and is gripped in the first internal skirt 209*c*. According to another embodiment, the internal clamping means 251 can take the form of a truncated cone as with the first embodiment.

To avoid rubbing of the aesthetic band 104 with respect to the attachment system 108, 208, 308, around, among other things, the vertical direction Z, the assembly 100, 200, 300 comprises anti-floating means 130, 230, 330 that provide pressure of the attachment system 108, 208, 308 against the aesthetic band 104. Furthermore, in the embodiments presented on FIGS. 4, 7 and 10, the anti-floating means 130, 230, 330 also provide pressure of the attachment system 108, 208, 308 against the outside of the neck 114, and more particularly on the top part 114*b* of the neck 114.

In the first and second embodiments of the invention, the anti-floating means 130, 230 take the form of anti-floating tongues 130, 230, where each is secured to the second plate 108*a*, 208*a* and projects, here from the external periphery of the second plate 108*a*, 208*a*, downwards and outwards to be in abutment through one of its faces against the internal face of the first external skirt 104*c* and through the other one of its faces against the outside of the neck 114 and more particularly here against the top part 114*b* of the neck 114. There are here four anti-floating tongues 130, 230 distributed around the vertical direction Z.

In the first embodiment of the invention, each anti-floating tongue 130 comes into abutment against the internal face of the first external skirt 104*c*, passing under the second external skirt 109*d*.

In the third embodiment of the invention, the anti-floating means 330 take the form of cambered walls 330 that here constitute a part of the external skirt 309*d*. Each cambered wall 330 has, on an external face, a groove that extends parallel to the vertical direction Z along the second external skirt 309*d* and on an internal face a camber that extends parallel to the vertical direction Z along the second external skirt 309*d* and constitutes here the bottom of the groove.

In each groove a rib 1002 of the first external skirt 104*c* provided for this purpose is inserted and where each groove exerts a pressure on the associated rib 1002 in a direction roughly perpendicular to the vertical direction Z. There are here two grooves per side of the aesthetic band 104.

At the same time, each camber exerts a pressure against the outside of the neck 114 and more particularly the top part 114*b* of the neck 114.

To hold the reservoir 120 when it is disposed in the bottle 102, the assembly 100, 200, 300 comprises holding means 126, 226, 326 that grip at least one out of the reservoir 120 or the dispensing mechanism 106 secured to said reservoir 120.

In the embodiment of the invention presented here, the reservoir 120 is removable, for example in order to be filled or replaced, and the reservoir 120 and the dispensing mechanism 106 are secured to each other and can be removed through the various windows. In the embodiment of the invention presented here, the reservoir 120, and the dispensing mechanism 106 are secured to each other by screwing by means of a thread 124.

In the first and third embodiments of the invention, the holding means 126, 326 take the form of a plurality of reliefs 126, 326 produced at the first internal skirt 109*c*, 309*c* of the cover 109, 309 and distributed around the third window 109*b*, 309*b*, where each relief 126, 326 extends inside said third window 109*b*, 309*b* and comes into abutment against the dispensing mechanism 106.

In the second embodiment of the invention, the holding means 226 take the form of holding tongues 226 secured to the second plate 208*a* and distributed inside the second window 208*b*, where each holding tongue 226 extends inside the third window 209*b* and comes into abutment against the reservoir 120.

Depending on the length of the first internal skirt 209*c*, the holding tongues 226 pass under the first internal skirt 209*c* or through the first internal skirt 209*c* by means of apertures 220 produced for this purpose through said first internal skirt 209*c*.

In the first embodiment of the invention, the assembly 100 comprises centring means 140 that provide the centring of the attachment system 108 with respect to the orifice 110. In the embodiment presented in FIGS. 2 to 4, the centring means 140 comprise at least three centring tongues 140 distributed around the vertical direction Z, secured to the second plate 108*a*, here to the external periphery of the second plate 108*a*, where each centring tongue 140 is arranged so that, in the assembled position, it is positioned aslant against the edge of the orifice 110. Each centring tongue 140 thus extends from the top, where it is secured to the second plate 108*a*, downwards, and from the outside inwards.

The invention claimed is:

1. An assembly having a vertical direction and comprising:

-a bottle comprising a hollow body and a neck at the a top of the hollow body, where an external perimeter of the neck takes a form of a rectangle with four rounded corners, where, at each corner and over a height of the neck, said neck divides into a bottom part extending upwards from the hollow body and a top part extending upwards from the bottom part, where, at each corner, the bottom part has an inward recess to form a shoulder under the top part, an aesthetic band comprising a first plate through which a first window passes and a first external skirt extending downwards from an external periphery of the first plate, where the aesthetic band is positioned on the neck, and an attachment system comprising:

a second plate through which a second window passes and positioned between the top part of the neck and the first plate of the aesthetic band, four lugs secured to the second plate, where each lug is positioned under one of the shoulders of the neck, and attachment means that provide the securing of the aesthetic band to said attachment system.

2. The assembly according to claim 1, wherein the aesthetic band comprises a cover that comprises a third plate which has passing through it a third window and positioned between the first plate and the second plate and a first internal skirt that extends downwards from an edge of the third window through the second window.

3. The assembly according to claim 2, wherein the attachment means take the form of an internal clamping means that is disposed along an edge of the second window and grips the first internal skirt.

4. The assembly according to claim 3, wherein the cover comprises a second external skirt secured to the third plate and extending downwards from an external periphery of the third plate and wherein the attachment means also consist of a tight fit between the first external skirt and the second external skirt.

5. The assembly according to claim 3, wherein the attachment means comprise an external clamping means disposed around the second plate and which rubs against an internal face of the first external skirt.

6. The assembly according to claim 3, wherein the internal clamping means takes the form of a hollow truncated cone a large base of which is secured to the second plate and a small base of which extends downwards from the large base and delimits a circle where the first internal skirt is inserted, or the internal clamping means takes the form of internal teeth issuing from the second plate and distributed around the second window while extending inwards so that an end of each internal tooth rubs against an internal face of the first internal skirt and grips in the first internal skirt.

7. The assembly according to claim 2, wherein the cover comprises a second external skirt secured to the third plate and extending downwards from an external periphery of the third plate and wherein the attachment means also consist of a tight fit between the first external skirt and the second external skirt.

8. The assembly according to claim 1, wherein the assembly comprises anti-floating means that provide pressure of the attachment system against the aesthetic band and against an outside of the neck.

9. The assembly according to claim 8, wherein the anti-floating means take a form of anti-floating tongues, where each is secured to the second plate and projects downwards and outwards to be in abutment through one of its faces against an internal face of the first external skirt and through the other one of its faces against an outside of the neck.

10. The assembly according to claim 8, wherein the aesthetic band comprises a cover that comprises a second external skirt secured to a third plate of the cover and extending downwards from an external periphery of the third plate, wherein the anti-floating means take the form of cambered walls, wherein each cambered wall has, on an external face, a groove that extends parallel to the vertical direction along the second external skirt and on an internal face a camber that extends parallel to the vertical direction along the second external skirt, wherein in each groove a rib on the first external skirt is inserted, and where each groove exerts a pressure on the rib, and wherein each camber exerts a pressure against the outside of the neck.

11. The assembly according to claim 1, wherein the assembly comprises holding means intended to grip at least one out of a reservoir or a dispensing mechanism secured to said reservoir when they are disposed in the bottle.

12. The assembly according to claim 11, wherein the aesthetic band comprises a cover, wherein the holding means take the form of a plurality of reliefs produced at a first internal skirt of the cover and distributed around a third window, where each relief extends inside said third window and comes into abutment against the dispensing mechanism.

13. The assembly according to claim 11, wherein the holding means take the form of holding tongues secured to the second plate and distributed inside the second window, where each holding tongue extends inside a third window and comes into abutment against the reservoir.

14. The assembly according to claim 1, wherein the assembly comprises centring means that provide the centring of the attachment system with respect to the orifice.

15. The assembly according to claim 14, wherein the centring means comprise at least three centring tongues distributed around the vertical direction, secured to the second plate, where each centring tongue is arranged so that, in an assembled position, it the centring tongue is positioned aslant against an edge of the orifice.

* * * * *